United States Patent
Miyamoto et al.

(10) Patent No.: US 11,882,439 B2
(45) Date of Patent: Jan. 23, 2024

(54) AUTHENTICATION OF DEVICES USING TOUCH INTERFACE

(71) Applicant: International Business Machines Corporation, Armonk, NY (US)

(72) Inventors: Taihei Miyamoto, Tokyo (JP); Tohru Hasegawa, Tokyo (JP); Takahito Tashiro, Mitaka (JP); Masahito Sugita, Saitama (JP)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 16/687,781

(22) Filed: Nov. 19, 2019

(65) Prior Publication Data
US 2021/0150016 A1    May 20, 2021

(51) Int. Cl.
| | |
|---|---|
| H04W 12/06 | (2021.01) |
| G06F 21/36 | (2013.01) |
| G06F 3/04883 | (2022.01) |
| G06F 3/01 | (2006.01) |
| H04M 1/72412 | (2021.01) |
| G06F 3/041 | (2006.01) |

(52) U.S. Cl.
CPC ............ *H04W 12/06* (2013.01); *G06F 3/017* (2013.01); *G06F 3/04883* (2013.01); *G06F 21/36* (2013.01); *H04M 1/72412* (2021.01); *G06F 3/04144* (2019.05); *H04M 2250/22* (2013.01)

(58) Field of Classification Search
None
See application file for complete search history.

(56) References Cited

U.S. PATENT DOCUMENTS

| | | | |
|---|---|---|---|
| 4,710,759 A | 12/1987 | Fitzgibbon | |
| 5,133,052 A * | 7/1992 | Bier .................. | G06V 10/7515 345/619 |
| 8,577,292 B2 | 11/2013 | Huibers | |

(Continued)

FOREIGN PATENT DOCUMENTS

| | | |
|---|---|---|
| EP | 0568342 A1 | 11/1993 |
| JP | 2004501459 A | 1/2004 |

OTHER PUBLICATIONS

International Search Report and Written Opinion, International Application No. PCT/IB2020/060760, dated Feb. 25, 2021, 11 pages.

(Continued)

*Primary Examiner* — Stella Higgs
(74) *Attorney, Agent, or Firm* — Scott S. Dobson

(57) ABSTRACT

A method for authentication is provided. The method includes storing, by a first electronic device, first path information in a memory. The first path information includes data representing a first path of input on a touch interface associated with the first electronic device. One or more first portions of the first path information are communicated to a second electronic device. One or more second portions of second path information are received from the second electronic device. The one or more second portions are compared to the first path information. The second electronic device is authenticated based on similarity between the one or more second portions and the first path information. The method may allow for separate authentication to be performed by each device.

20 Claims, 8 Drawing Sheets

(56) References Cited

U.S. PATENT DOCUMENTS

| | | | |
|---|---|---|---|
| 9,015,798 B1* | 4/2015 | Matsuoka | G06F 21/31 726/16 |
| 9,490,981 B2* | 11/2016 | Thibadeau, Sr. | G06F 21/36 |
| 9,513,697 B2* | 12/2016 | Hayashi | H04W 12/50 |
| 9,710,639 B1* | 7/2017 | Saini | G06F 21/36 |
| 10,007,777 B1* | 6/2018 | Saini | G06F 21/36 |
| 10,027,657 B1* | 7/2018 | Vempati | H04L 63/08 |
| 10,558,355 B2* | 2/2020 | Bean | G06F 3/04883 |
| 11,258,859 B2* | 2/2022 | Tjora | H04L 67/52 |
| 2006/0236384 A1* | 10/2006 | Lindholm | H04L 9/3226 726/10 |
| 2009/0265470 A1* | 10/2009 | Shen | H04W 4/029 709/227 |
| 2010/0082990 A1* | 4/2010 | Grigorovitch | H04W 12/06 713/176 |
| 2011/0004436 A1 | 1/2011 | Beute | |
| 2012/0249415 A1* | 10/2012 | Nakajima | G06F 3/04883 345/1.3 |
| 2012/0324559 A1* | 12/2012 | Ran | G06F 21/36 726/9 |
| 2013/0169526 A1* | 7/2013 | Gai | G06F 3/03547 345/156 |
| 2013/0234965 A1* | 9/2013 | Hayashi | H04W 12/06 345/173 |
| 2013/0333020 A1* | 12/2013 | Deshpande | G06F 21/36 726/16 |
| 2014/0006954 A1* | 1/2014 | Raffa | G06V 40/20 715/733 |
| 2014/0071974 A1* | 3/2014 | Watari | H04W 12/06 370/338 |
| 2014/0160033 A1* | 6/2014 | Brikman | G06F 3/04883 345/173 |
| 2014/0176436 A1* | 6/2014 | Raffa | G06F 3/0304 345/158 |
| 2014/0204036 A1* | 7/2014 | Schillings | G06F 3/0418 345/173 |
| 2014/0206287 A1* | 7/2014 | Chang | H04W 4/025 455/41.2 |
| 2015/0007042 A1* | 1/2015 | Gay | G06F 3/0484 715/744 |
| 2015/0042589 A1* | 2/2015 | Seo | H04M 1/72412 345/173 |
| 2015/0091811 A1 | 4/2015 | Hombert | |
| 2015/0334519 A1 | 11/2015 | Gai et al. | |
| 2015/0349957 A1* | 12/2015 | Thibadeau, Sr. | H04L 63/0861 713/155 |
| 2015/0373010 A1* | 12/2015 | Zhang | H04L 63/083 726/7 |
| 2015/0382388 A1* | 12/2015 | Legallais | H04W 12/06 455/411 |
| 2016/0048322 A1* | 2/2016 | Raffa | G06V 40/20 715/733 |
| 2016/0065301 A1* | 3/2016 | Kukulski | H04W 4/80 455/41.2 |
| 2017/0032140 A1 | 2/2017 | Oh et al. | |
| 2017/0177291 A1* | 6/2017 | Gai | H04W 12/04 |
| 2017/0220179 A1* | 8/2017 | Szeto | G06F 3/1423 |
| 2018/0232136 A1* | 8/2018 | Sparandara | G06F 3/04886 |
| 2019/0018940 A1* | 1/2019 | Kang | G06F 3/04886 |
| 2019/0080189 A1* | 3/2019 | Van Os | G06F 3/016 |
| 2020/0104038 A1* | 4/2020 | Kamath | G06F 3/165 |
| 2021/0029135 A1* | 1/2021 | Kurian | H04L 63/12 |
| 2021/0349627 A1* | 11/2021 | Chang | G06F 3/0482 |

OTHER PUBLICATIONS

Examination Report No. 1 for Standard Patent Application, Application No. 2020386807, dated Feb. 2, 2023, 3 pgs.

Search Exam Report, Application No. GB2208934.6, dated Jun. 30, 2023, 4 pgs.

* cited by examiner

| No. | Angle | Relative Distance |
|---|---|---|
| ... | ... | ... |
| 20 | 10.3° | 0.32 |
| 21 | 10.6° | 0.36 |
| 22 | 10.5° | 0.43 |
| ... | ... | ... |

AUTHENTICATION OF DEVICES USING TOUCH INTERFACE

BACKGROUND

The present disclosure relates to authentication of electronic devices, and more specifically, to authentication of devices using touch interfaces.

When making a wireless connection between electronic devices, a user may select a particular device from a list of devices in the vicinity. It may be difficult for the user to determine which device is the correct device. This creates a risk of accidentally connecting to an erroneous device. Existing techniques for preventing erroneous connections can be cumbersome and require memorizing passwords. Some existing techniques do not provide for both electronic devices to perform independent authentication of the other device.

SUMMARY

According to embodiments of the present disclosure, a method for authentication is provided. The method includes storing, by a first electronic device, first path information in a memory. The first path information includes data representing a first path of input on a touch interface associated with the first electronic device. One or more first portions of the first path information are communicated to a second electronic device. One or more second portions of second path information are received from the second electronic device. The one or more second portions are compared to the first path information. The second electronic device is authenticated based on similarity between the one or more second portions and the first path information. The method may allow for separate authentication to be performed by each device.

According to further embodiments of the method, points in the first path are referenced by angles and relative distances calculated base on a set of reference points. This may allow for comparison across devices with differences in touch interfaces.

According to further embodiments of the method, a total number of points in the second path information is received from the second electronic device. The total number of points in the second path information is compared to a total number of points in the first path information. Based on a difference between the total number of points in the second path information and the total number of points in the first path information, a curve fitting algorithm is used to generate missing data points. This may allow for comparison across devices with differences in touch interface precision.

According to further embodiments of the present disclosure, a system and computer program product for performing the method is provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
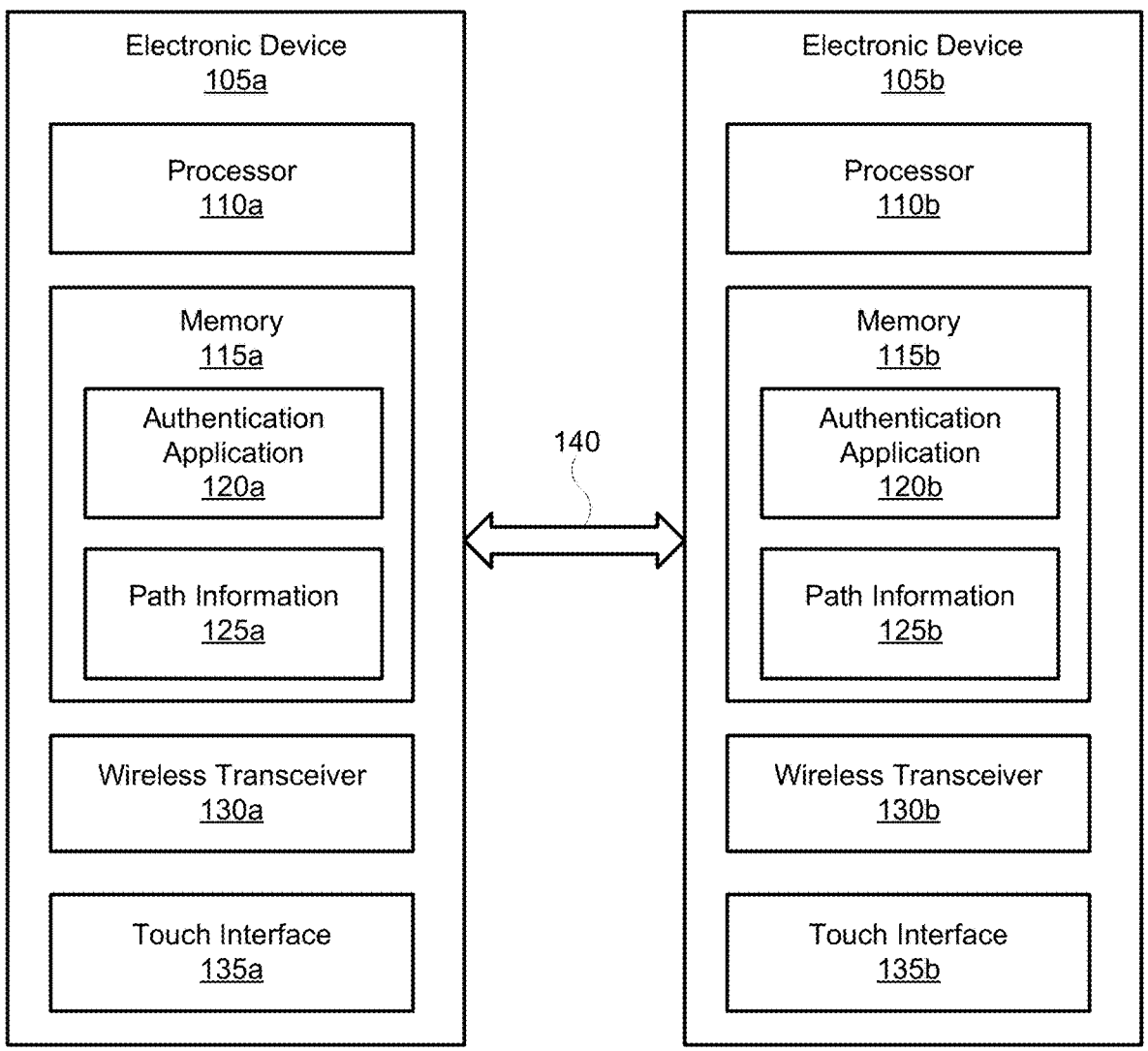
FIG. 1 depicts a block diagram of an example system for authentication of electronic devices using touch interfaces according to embodiments

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to authentication of electronic devices, and more particular aspects relate to authentication of devices using touch interfaces. While the present disclosure is not necessarily limited to such applications, various aspects of the disclosure may be appreciated through a discussion of various examples using this context.

Embodiments of the present disclosure provide for authenticating two devices by comparing the similarity of a path input on a touch interface of each electronic device. A user may input the same path on the touch interface of each device. As used herein a touch interface may be any interface for sensing a touch input. For example, the touch interface may be a touchscreen or a touchpad. Each electronic device may communicate one or more portions of the path data from the path input on their respective touch interface to the other electronic device. Each electronic device may compare the portions of path data received from the other device to the path data from the path input on their touch interface. Each electronic device may authenticate the other based on similarity of the portions of path data received and their stored path data.

A user may initiate the authentication process using a user interface of an electronic device. For example, the user may request a wireless connection to a second electronic device or may request to send data to a second electronic device. The user may then input the same path onto touch interfaces associated with each device. The user may input the paths onto each touch interface at the same time. To input the same path onto each touch interface, the user may arrange each electronic device such that the user may draw the path using different fingers on one hand while maintaining the same relative position between the fingers. The user may input the paths on the electronic devices using a finger, stylus, pen, or any other suitable object or device for providing input on a touch interface.

In response to receiving the user input of a path, each electronic device may store path information in a memory. In some embodiments, the path data input by the user may be normalized to create the path information to allow for comparison between devices with differences in their touch interfaces such as resolution or orientation. The normalization may be based on a set of reference points. For example, coordinates of each data point of the input on the touch interface may be converted into a relative distance from a reference point and an angle from a reference line. In some embodiments, the reference point is the start point or the end point of the path input by the user and the reference line is a line between the start point and end point.

The electronic devices may select one or more portions of the stored path information and exchange the portions with the other electronic device. In some embodiments, the exchange may occur at essentially the same time. In some embodiments, a first electronic device may communicate their portions to the second electronic device and the second electronic device may communicate their portions to the first electronic device after authenticating the portions from the first electronic device.

Each electronic device may compare the portions of path information received from the other electronic device to their stored path information. Each electronic device may authenticate the other based on the similarity of the received portions of path information to their stored path information.

If both electronic devices authenticate each other, an action may be performed. In some embodiments, the action may be establishing a wireless connection between the electronic devices such as a Bluetooth connection. In some embodiments, data may be transferred between the electronic devices in response to the electronic devices authenticating each other. For example, one of the electronic devices may communicate one or more images, videos, or documents to the other electronic device. In some embodiments, each device may store an identifier for the other electronic device indicating that the device is authenticated for future actions.

In some embodiments, the electronic devices are configured to select different portions of the stored path information to the other electronic device. In these embodiments, the electronic devices may fail to authenticate the other device if the portions of path information received overlap with portions of path information communicated to the other device. For example, a first electronic device would not be authenticated by a second electronic device if it simply communicated the same portions that it had received from the first device. This may provide for a more secure authentication method by allowing for each electronic device to perform a separate authentication with independent data.

While the above description has been focused on the authentication of two devices, any number of devices may be authenticated using aspects of the present disclosure.

FIG. 1 depicts a block diagram of an example system 100 for authentication of electronic devices using touch interfaces according to embodiments. The system includes two electronic devices 105a-b. In some embodiments each electronic device 105a-b may be computer system 901 described in reference to FIG. 9. Each electronic device has a processor 100a-b, memory 115a-b, wireless transceiver 130a-b, and a touch interface 135a-b. Each memory 115a-b may store authentication application 120a-b and path information 125a-b.

Each processor 110a-b may be configured to execute the respective authentication application 120a-b to perform authentication of the other electronic device. For example, processor 110a may be configured to execute authentication application 120a to perform authentication of electronic device 105b. Authentication applications 120a-b may be configured to cause their respective devices to perform method 300 described in reference to FIG. 3. Touch interfaces 135a-b may be configured to receive touch input from a user. Authentication applications 120a-b may be configured to prompt a user to provide a path input into respective touch interfaces 135a-b and store path information 125a-b corresponding to the path input in their respective memories 115a-b. As described herein, authentication applications 120a-b may be configured to convert the path input into a normalized form to store as path information 125a-b. Authentication applications 120a-b may be configured to exchange portions of path information between electronic devices 105a-b through a communication pathway 140. Communication pathway 140 may occur via wireless transceivers 130a-b. Communication pathway 140 may be implemented using any suitable communication technology.

Authentication applications 120a-b may be configured to compare the portions of path information received from the other electronic device to the path information 125a-b in their respective memory 115a. For example, authentication application 120a may compare portions of path information 125b received from electronic device 105b against path information 125a to determine a similarity. In some embodiments, authentication applications 120a-b may be further configured to exchange the total number of data points in their respective path information 125a-b along with the portions of path information. In these embodiments, the authentication applications may be configured to generate additional data points for the received portions of path information or the path information stored in their respective memory prior to performing the comparison as described herein. This may allow for comparison across devices with differences in precision of their touch interfaces. Further, in some embodiments, the authentication applications 120a-b are configured to exchange an identification of which specific data points are provided in the portions. For example, authentication application 120a may communicate to electronic device 105b that path information 125a includes 50 data points and identify that the portions of path information provided correspond to points 4-10 and 25-40 of the consecutively numbered points.

The exchange of portions of path information may occur at different times. In some embodiments, one electronic device communicates their portions of path information to the other electronic device and the other electronic device does not communicate their portions of path information until they authenticate the first device.

The authentication applications 120a-b may be configured to authenticate the other device if the portions of path data received and the path information 125a-b stored in their respective memory are sufficiently similar. For example, a similarity score may be calculated and may be compared to a threshold similarity score. In response to authenticating the other device, the authentication application may be configured to perform different actions. In some embodiments, the authentication applications 102a-b may be configured to establish a wireless connection between electronic devices 105a-b in response to authenticating. In some embodiments, the transfer of data between electronic devices 105a-b may occur in response to the authenticating.

Figure 2:
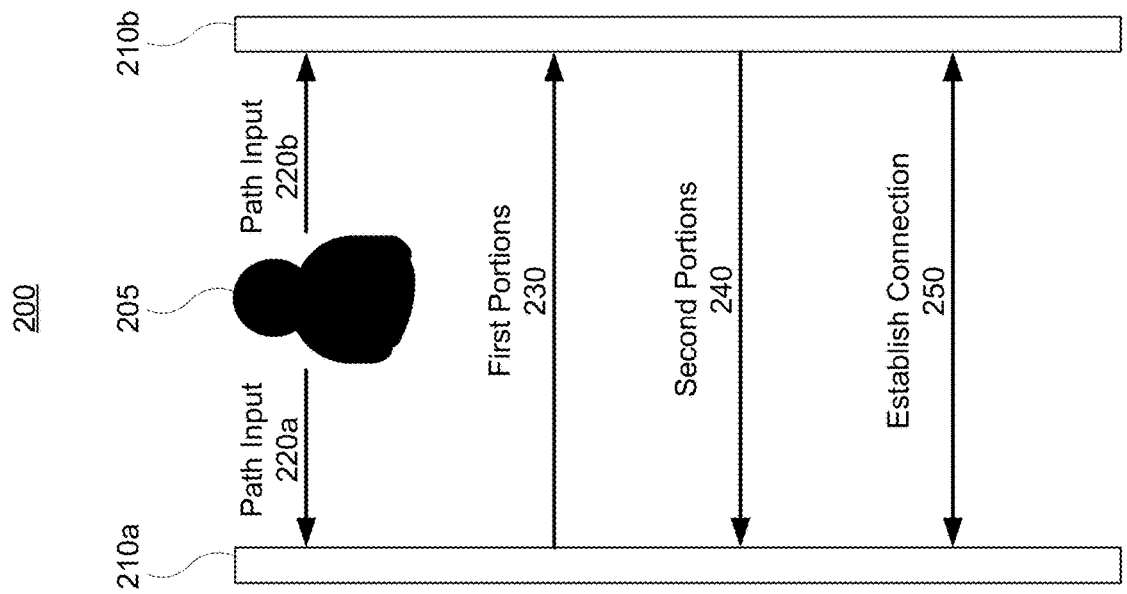
FIG. 2 depicts an example information flow diagram according to embodiments.

Referring now to FIG. 2, an example information flow diagram 200 according to embodiments is depicted. FIG. 2 depicts the flow of information between a user 205 and electronic devices 210a and 210b. The flow begins with User 205 creating path input 220a on a touch interface of electronic device 210a and creating path input 220b on a touch interface of electronic device 210b. In response to receiving path input 220a, electronic device 210a may store path information corresponding to path input 220a and electronic device 210b may store path information corresponding to path input 220b. Electronic device 210a may communicate one or more first portions of path information 230 to electronic device 210b. Electronic device 210b may compare the one or more first portions of path information to its stored path information to determine a similarity. In response to authenticating electronic device 210a based on the similarity, electronic device 210b may communicate one or more second portions of path information 240 to electronic device 210a. In response to receiving the one or more second portions, electronic device 210a may compare the one or more second portions to store path information to determine a similarity. In response to authenticating electronic device 210b based on the similarity, electronic device 210a may establish a connection 250 with electronic device 210b.

Figure 3:
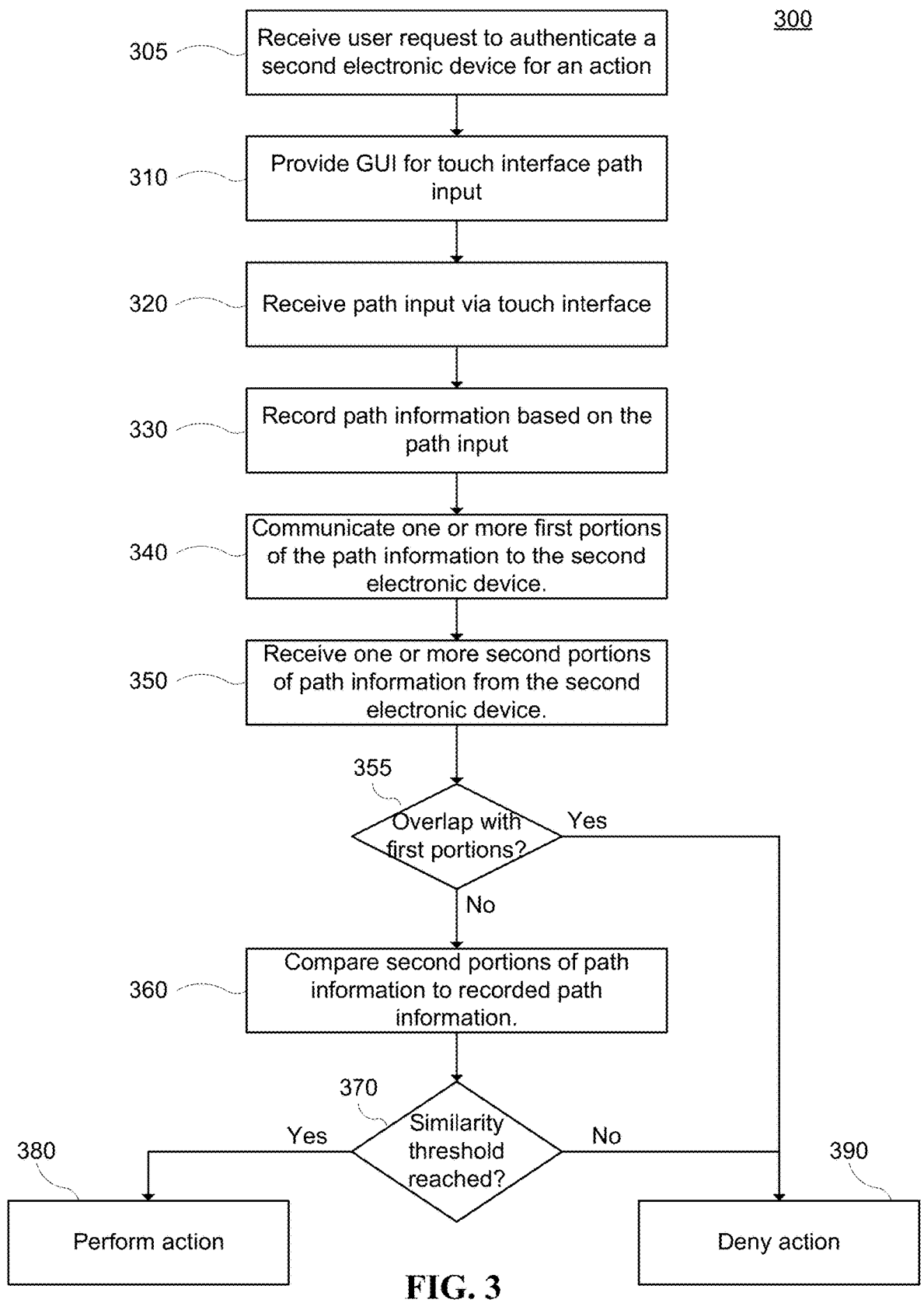
FIG. 3 depicts a flowchart of an example method for authenticating an electronic device according to embodiments.

Referring now to FIG. 3, a flowchart of an example method 300 for authenticating an electronic device according to embodiments is depicted. Method 300 may be performed by a first electronic device for authenticating a second electronic device. Method 300 may be performed by electronic devices 105a or 105b described in reference to FIG. 1. Method 300 may also be performed by computer system 901 described in reference to FIG. 9. For the purpose of describing method 300, the method will be described as being performed by a first electronic device for authenticating a second electronic device.

Method 300 may begin with the first electronic device receiving a request from a user to authenticate a second electronic device for an action, per 305. The action may be, for example, establishing a wireless connection, such as a Bluetooth connection, or transferring data. The request may be received by the first electronic device via a user interface. For example, the first electronic device may provide a graphical user interface allowing for the selection of a second electronic device and an action to perform upon authenticating the second electronic device. The graphical user interface may provide a list of electronic devices that are in close proximity to the first electronic device. For example, the list may include electronic devices that are available for a wireless connection such as a Bluetooth connection.

In response to receiving the request from the user, the first electronic device may provide a graphical user interface (GUI) on a touch interface, such as a touchscreen display, for receiving path input from the user, per 310. The GUI may display an instruction for the user draw a path on the touch interface. In some embodiments, the GUI may provide instructions for the user to draw a path on each electronic device simultaneously. The GUI may indicate a specific area on the touch interface to provide the path input.

Path input may be received by the first electronic device via the touch interface, per 320. The user input into the touch interface that corresponds to the path input may be determined in various ways. In some embodiments, the path input may be the first continuous input provided on the touch interface after the GUI for receiving the path input is provided. For example, the first path may start where a user first touches the touch interface and end where the user first stops touching the touch interface. In some embodiments, a specified period of time may be provided for providing the path input and the path is not necessarily continuous. For example, the electronic device may provide 5 seconds for the user to provide an input path and may allow the user to provide multiple paths. In some embodiments, the path input may be temporarily stored in a short-term memory as coordinates of points sensed by the touch interface on the path input.

In some embodiments, the first electronic device may require that the path input exceed a security threshold. For example, the first electronic device may require that the path input be at least a threshold length or include a threshold number of data points. A user may be prompted to provide another path input if the original path input does not exceed the security threshold.

In response to receiving the path input, the first electronic device may record path information in a memory, per 330. In some embodiments, the path information is a normalized version of the path input. The first electronic device may convert coordinates of points on the path input based on a set of reference points as described herein such that differences in touch interface orientation and resolution may be accounted for between the first and second electronic devices. In some embodiments, the path information includes angles and relative distances for representing each point in the path input. In some embodiments, the path information includes a time for each data point. The time may be the time that the specific input point was received or may be a relative time based on, for example, the time of that the first input point was received or the time that a user is prompted for path input.

One or more first portions of the path information may be communicated to the second electronic device, per 340. The one or more first portions may be communicated directly to the second electronic device using a wireless communication method or may be communicated indirectly using one or more networks. In some embodiments, each portion may be a continuous set of points of the path. In some embodiments, the portions may be individual points. The one or more portions may be selected by the first electronic device in a number of ways. In some embodiments, the portions may be selected randomly using a set of selection rules. Example selection rules may include rules about the number of portions, a required number of points in each portion, and a required percentage of the path information included in the portions. For example, the electronic device may be configured to select three portions with each portion having at least 3 points and the three portions including less than 50% of the path information. In some embodiments, the first electronic device may be configured to select the one or more first portions in a more specified manner. For example, the first electronic device may be configured to select the first quarter and the third quarter of path information as portions to send to the second electronic device. In some embodiments, the first electronic device may further communicate additional information, such as the total number of points in the path information and identification of which points are included in the one or more first portions, which may be used to compare the portions to recorded path information as described herein.

One or more second portions of path information may be received from the second electronic device, per 350. The one or more first portions may be communicated directly to the second electronic device using a wireless communication technology or may be communicated indirectly using one or more networks. In some embodiments, this may occur in response to the second electronic device receiving the first portions of path information. In some embodiments, this may occur in response to the second electronic device authenticating the first electronic device based on the first portions of path information. In some embodiments, the second electronic device may communicate the second portions to the first electronic device independent of receiving the first portions. In some embodiments, a total number of points in the path information and identification of which points are included in the one or more second portions may be received with the one or more second portions.

In response to receiving the one or more second portions, the first electronic device may determine whether the one or more second portions overlap with the one or more first portions that were communicated to the second electronic device, per 355. As used herein, the term overlap may mean that the first portion includes a path or points on a path that correspond to at least some of the paths or points on a path included in the first portion. In some embodiments, this may include determining whether any part of the second portions overlap with the first portions. In some embodiments, this may include determining whether there is a threshold level of overlap between the second portions and the first portions. For example, the threshold may be based on a total number of points that overlap or a percentage of points in the second portion that overlap.

In response to determining that the one or more second portions overlap with the one or more first portions or that the amount of overlap exceeds a threshold, the first electronic device may deny the request to perform the action, per 390. In some embodiments, the electronic device may display a notification to the user indicating that the authentication failed. In some embodiments, the first electronic device may communicate a notification to the second electronic device indicating that authentication has failed.

In response to determining that the one or more second portions do not overlap with the one or more first portions or the amount of overlap does not exceed a threshold, the first electronic device may compare the second portions to the recorded path information, per 360. The comparison may include determining the differences between points in the one or more second portions and points in the recorded path information.

In embodiments where the total number of points in the path information is also received from the second electronic device, the first electronic device may fill in missing data points in either the recorded path information or the one or more second portions prior to performing the comparison. For example, if the recorded path information on the first electronic device has 60 data points and the path information from the second electronic device has 120 data points, the first electronic device may generate 60 additional data points for the recorded path information between the existing points using a curve fitting algorithm such as linear interpolation.

In some embodiments, a formula may be used to determine a similarity score based on the differences between the one or more second portions and the recorded path information. Alternatively, in some embodiments, the comparison may include determining whether points on the one or more second portions are identical to points on the recorded path information. Differences may be determined based on any of the path information received in the one or more second portions. For example, the angles and relative distances for specific points may be compared and used to calculate similarity. Further, if the path information includes a time for each point, differences in time may be compared.

The specific points to compare between the one or more second portions and the recorded path information may be determined in various ways. In some embodiments, the specific portions that are selected by the second electronic device are predetermined such that the first electronic device knows which points in the recorded path information should correspond. In some embodiments, the second electronic device may identify which specific points are included in the one or more second portions. For example, the second electronic device may include the total number of points in its recorded path information and may provide a number for each of the points in the one or more second portions that indicates the position of the point in the recorded path information. In some embodiments, instead of using the time values for each point to determine differences in time, the time value may be used to identify which points in the one or more second portions correspond to which points in the recorded path information.

The first electronic device may determine whether a similarity threshold has been reached, per 370. In some embodiments, the first electronic device may determine whether a calculated similarity score exceeds a specified threshold value. In some embodiments, the first electronic device may determine whether a number or percentage of points in the one or more second portions match points in the stored path information.

In response to determining that the similarity threshold is reached, the action specified by the user may be performed by the first electronic device, per 380. For example, a connection to the second electronic device may be established or data may be transferred to the second electronic device. In response to determining that the similarity threshold is not reached, the action specified by the user may be denied, per 390.

While method 300 has been described in reference to authentication with a second electronic device, the method may similarly be applied to authentication of any number of electronic devices. For example, the first electronic device may receive a request to authenticate two electronic devices for an action at 305. At 340, the first electronic device may communicate the one or more portions to the two electronic devices. At 350, the first electronic device may receive second portions from one of the two electronic devices and third portions from the other electronic device. At 355, the first electronic device may determine whether the second and third portions overlap with the first portions. This may be performed individually for each device or on the combination of devices. At 360, the first electronic device may compare the second and third portions to the recorded path information. For authentication of multiple devices, operations 370-390 may be performed individually for each device being authenticated or may be performed on the combination of devices. For example, the first electronic device may authenticate just one of the electronic devices based on the similarity of the second portion reaching the threshold and the similarity of the third portion failing to reach the similarity threshold. Alternatively, the first electronic device may fail to authenticate both devices where the second portion reaches the similarity threshold and the third portion fails to reach the similarity threshold.

Figure 4:
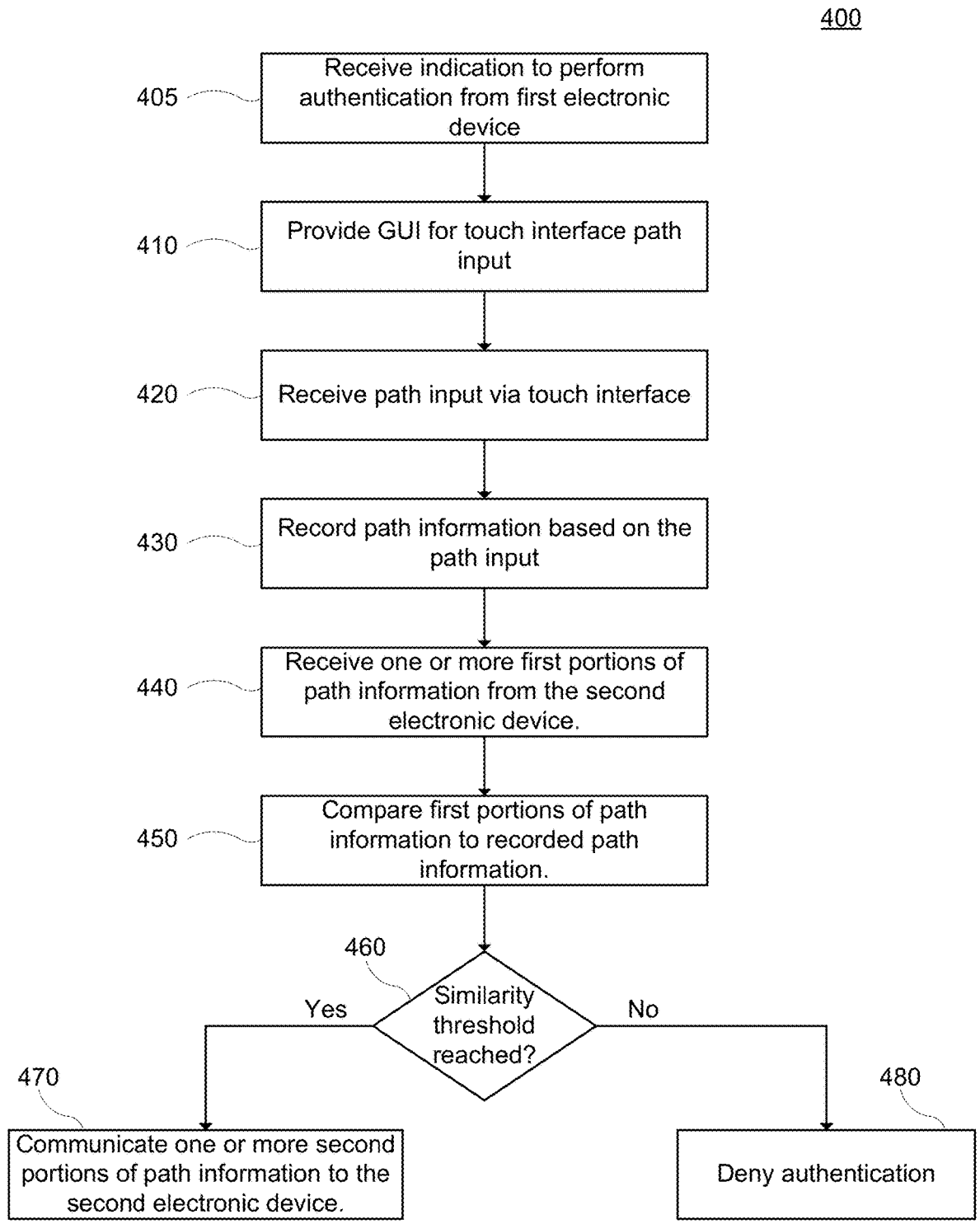
FIG. 4 depicts a flowchart of a second example method for authenticating an electronic device according to embodiments.

Referring now to FIG. 4, a flowchart of a second example method 400 for authenticating an electronic device according to embodiments is depicted. Method 400 may be performed by a second electronic device for authenticating a first electronic device. Method 400 may be performed by electronic devices 105*a* or 105*b* described in reference to FIG. 1. Method 400 may also be performed by computer system 901 described in reference to FIG. 9. For the purpose of describing method 400, the method will be described as being performed by a second electronic device for authenticating a first electronic device.

Method 400 may begin with the second electronic device receiving an indication to perform authentication from a first electronic device, per 405. The request may be received directly from the first electronic device using a wireless communication method or may be received over one or more networks.

In response to receiving the request, the second electronic device may provide a graphical user interface (GUI) on a touch interface, such as a touchscreen display, for receiving path input from the user, per 410. The GUI may display an instruction for the user draw a path on the touch interface. In some embodiments, the GUI may provide instructions for the user to draw a path on each electronic device simultaneously. The GUI may indicate a specific area on the touch interface to provide the path input.

Path input may be received by the second electronic device via the touch interface, per 420. The user input into the touch interface that corresponds to the path input may be determined in various ways. In some embodiments, the path input may be the first continuous input provided on the touch interface after the GUI for receiving the path input is provided. In some embodiments, a specified period of time may be provided for providing the path input and the path is not necessarily continuous. In some embodiments, the path input may be temporarily stored in a short-term memory as coordinates of points sensed by the touch interface on the path input.

In response to receiving the path input, the second electronic device may record path information in a memory, per 430. In some embodiments, the path information is a normalized version of the path input. The second electronic device may convert coordinates of points on the path input based on reference lines and points as described herein such that differences in touch interface orientation and resolution may be accounted for between the first and second electronic devices. In some embodiments, the path information includes an angle and relative distance for representing each point in the path input. In some embodiments, the path information includes a time for each data point. The time may be the time that the specific input point was received or may be a relative time based on, for example, the time of that the first input point was received or the time that a user is prompted for path input.

One or more first portions of path information may be received from the first electronic device, per 440. The one or more first portions may be communicated directly to the second electronic device using a wireless communication method or may be communicated indirectly using one or more networks. In some embodiments, a total number of points in the path information and identification of which points are included in the one or more first portions may be received with the one or more first portions.

In response to receiving the one or more first portions, the second electronic device may compare the first portions to the recorded path information, per 450. The comparison may include determining the differences between points in the one or more second portions and points in the recorded path information.

In embodiments where the total number of points in the path information is also received from the first electronic device, the second electronic device may fill in missing data points in either the recorded path information or the one or more first portions prior to performing the comparison.

In some embodiments, a formula may be used to determine a similarity score based on the differences between the one or more second portions and the recorded path information. Alternatively, in some embodiments, the comparison may include determining whether points on the one or more second portions are identical to points on the recorded path information. Differences may be determined on any of the path information received in the one or more second portions. For example, the angles and relative distances for specific points may be compared and used to calculate similarity. Further, if the path information includes a time for each point, differences in time may be compared.

The specific points to compare between the one or more first portions and the recorded path information may be determined in various ways. In some embodiments, the specific portions that are selected by the first electronic device are predetermined such that the first electronic device knows which points in the recorded path information should correspond. In some embodiments, the first electronic device may identify which specific points are included in the one or more second portions. For example, the first electronic device may include the total number of points in its recorded path information and may provide a number for each of the points in the one or more second portions that indicates the position of the point in the recorded path information (e.g., point 20 out of 100 for points numbered consecutively in order of when they were received). In some embodiments, instead of using the time values for each point to determine differences in time, the time value may be used to identify which points in the one or more first portions correspond to which points in the recorded path information.

The second electronic device may determine whether a similarity threshold has been reached, per 460. In some embodiments, the second electronic device may determine whether a calculated similarity score exceeds a specified threshold value. In some embodiments, the second electronic device may determine whether a number or percentage of points in the one or more second portions match points in the stored path information.

In response to determining that the similarity threshold is reached, one or more second portions of the path information may be communicated to the first electronic device, per 470. The one or more first portions may be communicated directly to the first electronic device using a wireless communication method or may be communicated indirectly using one or more networks. In some embodiments, each portion may be a continuous set of points of the path. In some embodiments, the portions may be individual points. The one or more portions may be selected by the second electronic device in a number of ways. In some embodiments, the portions may be selected randomly using a set of selection rules. Example selection rules may include rules about the number of portions, a required number of points in each portion, and a required percentage of the path information included in the portions. For example, the electronic device may be configured to select three portions with each portion having at least 3 points and the three portions including less than 50% of the path information. The rules may further require that the second portions do not overlap with the first portions. In some embodiments, the second electronic device may be configured to select the one or more second portions in a more specified manner. For example, the first electronic device may be configured to select the second quarter and the fourth quarter of path information as portions to send to the first electronic device. In some embodiments, the second device will select all portions that do not correspond to the first portions received from the first device. In some embodiments, the second electronic device may further communicate additional information such as the total number of points in the path information and identification of which points are included in the one or more first portions which may be used to compare the portions to recorded path information as described herein.

In response to determining that the similarity threshold is not reached, the authentication may be denied, per 480. In some embodiments, the second electronic device may display a notification to the user indicating that the authentication failed. In some embodiments, the second electronic device may communicate an indication of the failed authentication to the first electronic device.

Figure 5:
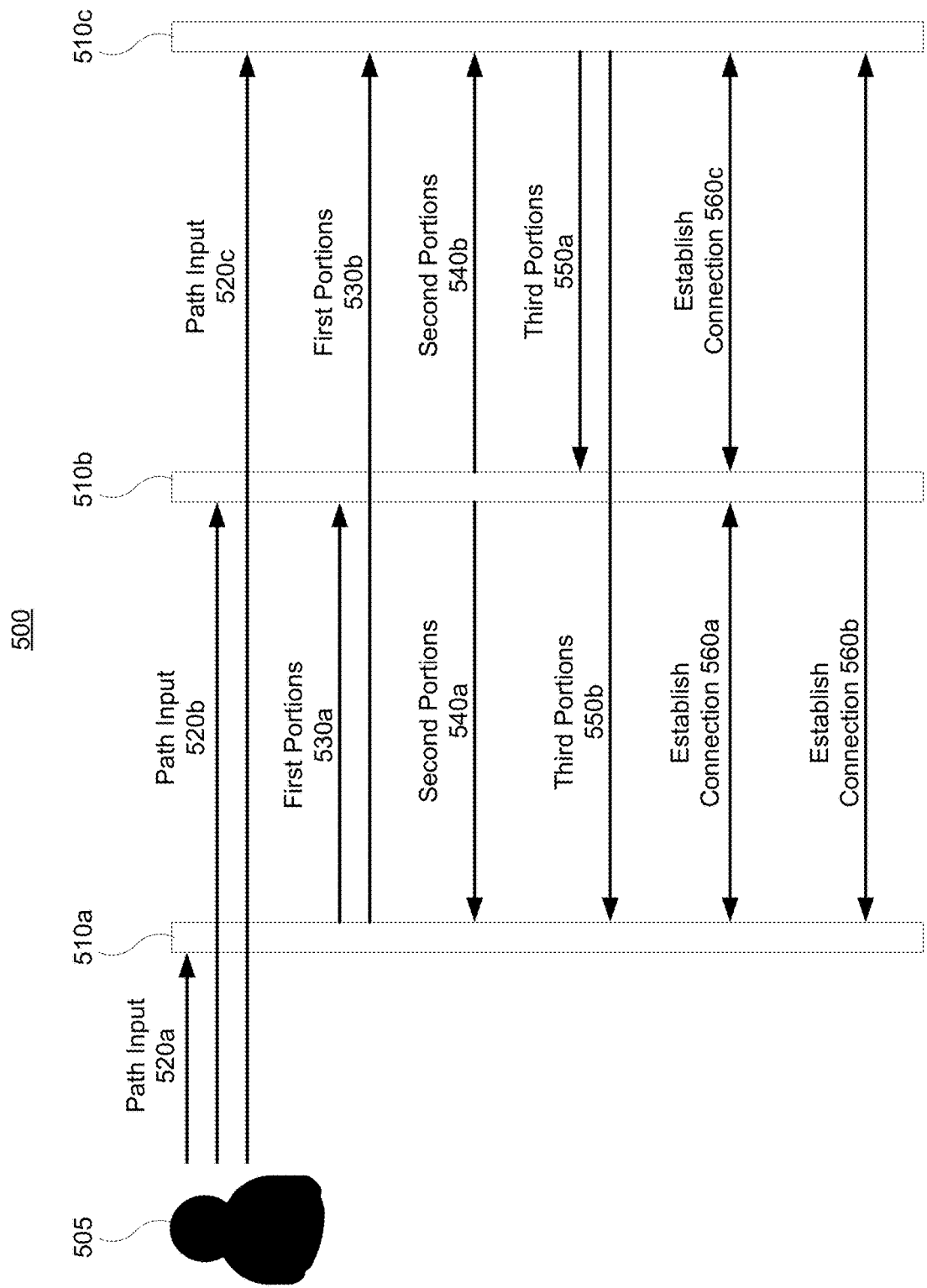
FIG. 5 depicts an example information flow diagram for authentication of 3 electronic devices according to embodiments.

Referring now to FIG. 5, an example information flow diagram 500 for authentication of 3 electronic devices according to embodiments is depicted. FIG. 5 depicts the flow of information between a user 505 and electronic devices 510*a*, 510*b*, and 510*c*. The flow begins with User 505 creating path input 520*a* on a touch interface of electronic device 510*a*, creating path input 520*b* on a touch interface of electronic device 510*b*, and creating path input 520*c* on electronic device 510*c*. In response to receiving path input 520*a-c*, electronic device 510*a* may store path information corresponding to path input 520*a*, electronic device 510*b* may store path information corresponding to path input 520*b*, and electronic device 510*c* may store path information corresponding to path input 520*c*. Electronic device 510*a* may communicate one or more first portions of the path information 530*a* to electronic device 510*b* and one or more first portions of path information 530*b* to electronic device 510*c*. Electronic device 510*b* may communicate one or more second portions of stored path information 540*a* to electronic device 510*a* and one or more second portions of stored path information 540*b* to electronic device 510*c*. Electronic device 510*c* may communicate one or more third portions of stored path information 550*a* to electronic device 510*b* and one or more third portions of stored path information 550*b* to electronic device 510*a*. The portions of path information sent to each electronic device by a given electronic device may be the same or different. For example, first portions 530*a* and 530*b* may be the same or they may be different.

In response to receiving the portions from the other electronic devices, each electronic device 510*a-c*, may authenticate each other device based on the similarity of the portions to their stored path information. Electronic device 510*a* may establish a connection 560*a* with electronic device 510*b*, electronic device 510*b* may establish a connection 560*c* with electronic device 510*c*, and electronic device 510*a* may establish a connection 560*b* with electronic device 510*c*.

Figure 6B:
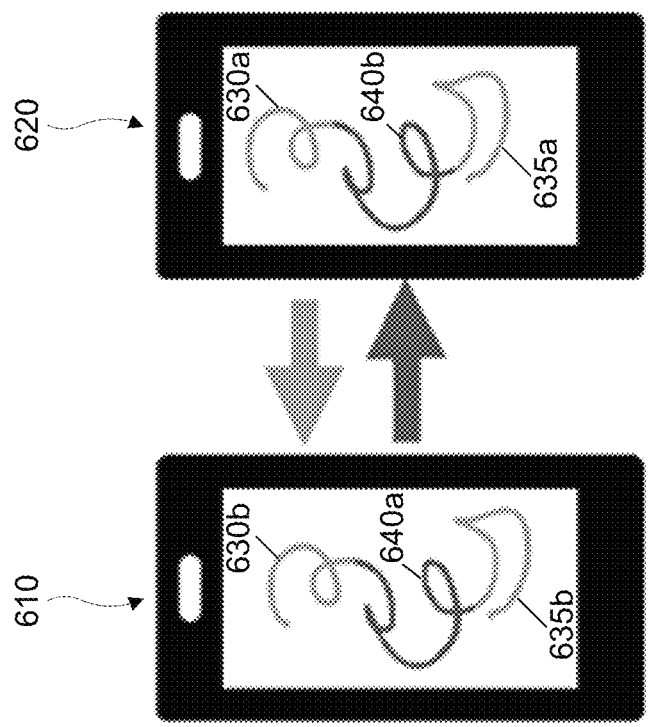
FIG. 6B depicts an illustrative diagram of path input compared across electronic devices according to embodiments.
Figure 6A:
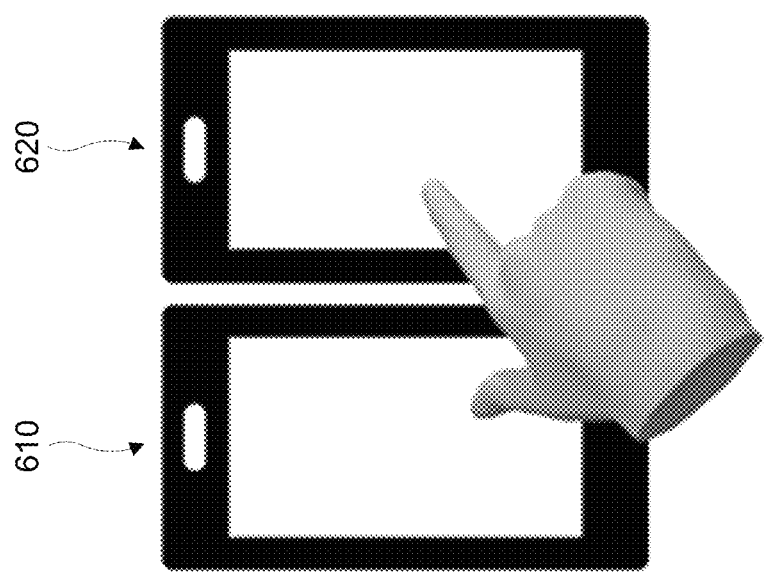
FIG. 6A depicts an illustration of an example method for a user to input a path on two devices according to embodiments.

Referring now to FIGS. 6A and 6B, a pictorial representation of authentication of electronic devices according to embodiments of the present disclosure is provided. FIG. 6A shows an example method for a user to input a path on two devices 610 and 620 according to embodiments. As depicted, a user may arrange two devices side by side and place a finger on the touchscreen of each device. FIG. 6A depicts a hand with the thumb on the touchscreen of electronic device 610 and the index finger of the same hand on the touchscreen of electronic device 620. The user may move their hand with the fingers on the touchscreens as depicted in FIG. 6A to trace a path on each touchscreen such as the paths depicted in FIG. 6B. If the user maintains the same relative positions of their fingers, the paths input into each touchscreen should be essentially the same.

FIG. 6B is an illustrative diagram of path input compared across electronic devices. Electronic device 620 may select portions 630*a* and 635*a* of the path input to communicate to electronic device 610. Electronic device 610 may select portion 640 of the path input to communicate to electronic device 620. Electronic device 620 may authenticate electronic device 610 based on the similarity of portions 630*a* and 635*a* received from electronic device 610 to the corresponding portions 630*b* and 635*b* of the path input. Electronic device 620 may authenticate electronic device 610 based on the similarity of portion 640*a* to the corresponding portion 640*b* of the path input.

Figures 7, 8:
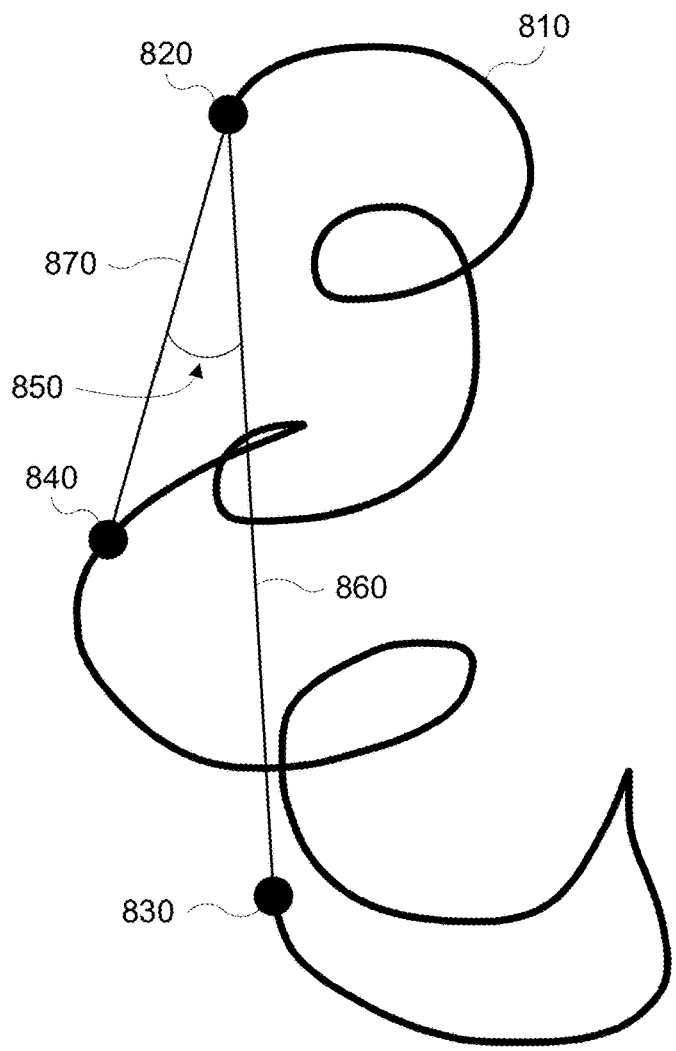
FIG. 7 depicts an example table for storing path information according to embodiments.
FIG. 8 depicts an example path input according to embodiments.

Now referring to FIG. 7, an example table 700 for storing path information according to embodiments is depicted. Table 700 includes a number column indicating the ordered number of the point, an angle column indicating the angle of a point relative to a reference line (e.g., a line between two reference points), and a relative distance column indicating the relative distance to from the point to a reference point. The path information stored in table 700 may represent normalized data that may be compared across electronic devices.

Now referring to FIG. 8, an example path input 810 is depicted according to embodiments. Path 810 may include a start point 820 and an end point 830. Path information recorded based on path 810 may be normalized using the start point 820 and end point 830 as a set of reference points. For example, point 840 may be referenced in the path information as an angle 850 between line 860 and line 870, where line 860 is a line between start point 820 and end point 830 and line 870 is a line between the start point 820 and point 840. The point 840 may further be referenced in the path information using a relative distance calculated by dividing the distance between start point 820 and point 840 by the distance between start point 820 and end point 803 (i.e., the distance of line 870 divided by the distance of line 860).

The specific method of determining the angle and relative distance described above in reference to FIG. 8 are provided as one example. The angle and relative distance could be calculated in many different ways with different reference points and reference lines.

Figure 9:
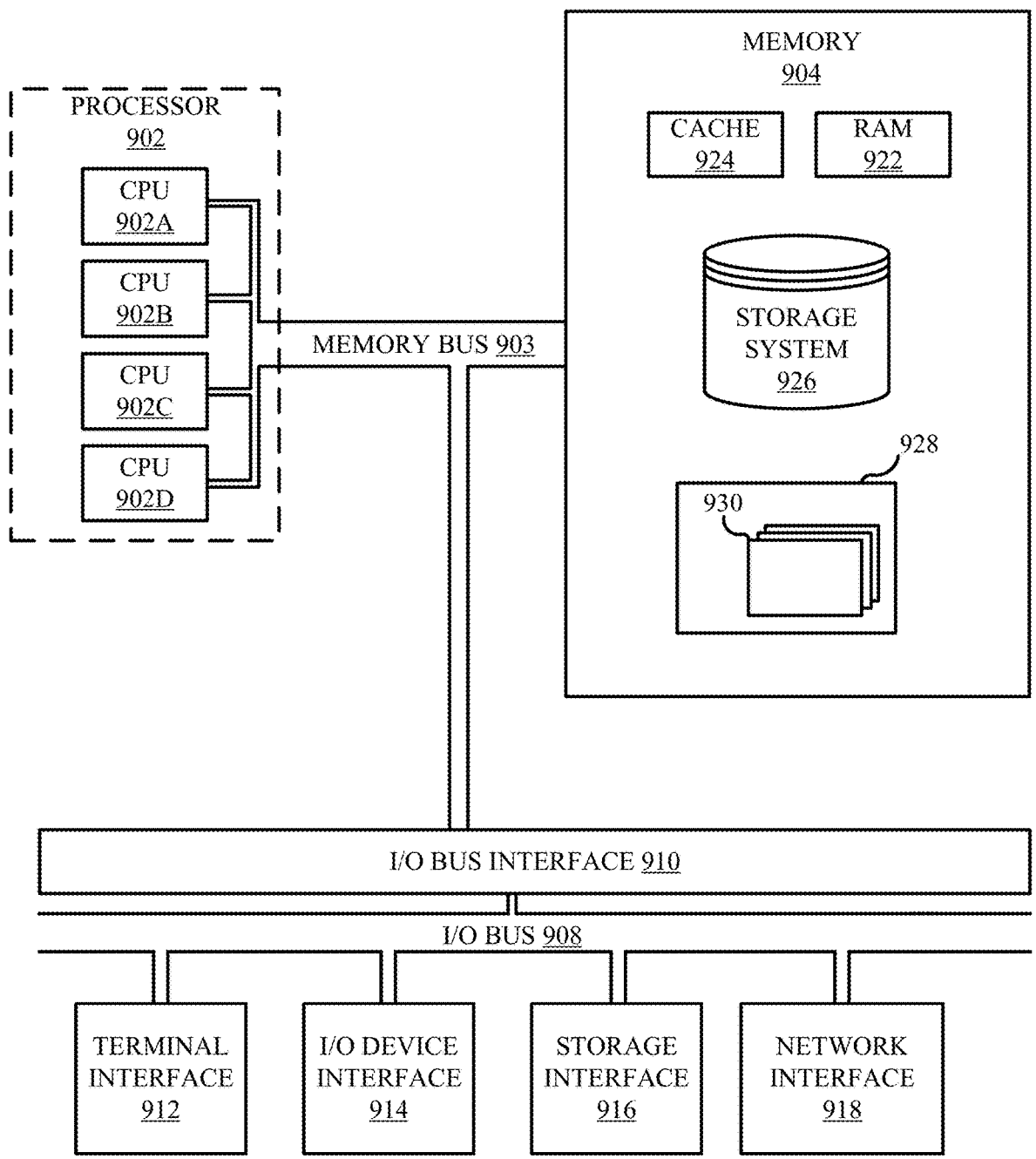
FIG. 9 is a high-level block diagram of an example computer system according to embodiments.

Referring now to FIG. 9, shown is a high-level block diagram of an example computer system 901 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 901 may comprise one or more CPUs 902, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface unit 910.

The computer system 901 may contain one or more general-purpose programmable central processing units (CPUs) 902A, 902B, 902C, and 902D, herein generically referred to as the CPU 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 930 may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 930 generally perform the functions or methodologies of various embodiments. Programs/utilities 920 may include an authentication application such as authentication applications 120*a-b* described in reference to FIG. 1. The authentication application may be configured to perform method 300 described in reference to FIG. 3 and method 400 described in reference to FIG. 4.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units are shown, which separate the I/O bus 908 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface, but receives requests from other computer systems (clients). Further, in some embodiments, the computer system 901 may be implemented as a desktop computer, portable computer, laptop or notebook computer, tablet computer, pocket computer, telephone, smart phone, network switches or routers, or any other appropriate type of electronic device.

It is noted that FIG. 9 is intended to depict the representative major components of an example computer system 901. In some embodiments, however, individual components may have greater or lesser complexity than as represented in FIG. 9, components other than or in addition to those shown in FIG. 9 may be present, and the number, type, and configuration of such components may vary.

Embodiments of the present disclosure include a computer-implemented method including: storing, by a first electronic device, first path information in a memory, the first path information comprising data representing a first path of input on a touch interface associated with the first electronic device; communicating one or more first portions of the first path information to a second electronic device; receiving one or more second portions of second path information from the second electronic device; comparing the one or more second portions to the first path information; and authenticating, by the first electronic device, the second electronic device based on similarity between the one or more second portions and the first path information.

Some embodiments further include establishing, in response to the authenticating, a connection between the first electronic device and the second electronic device.

In some embodiments, the first path information comprises coordinates for points on the first path.

In some embodiments, the first path information comprises a time for each point on the first path.

In some embodiments, points in the first path are referenced by angles and relative distances calculated based on a set of reference points. In some embodiments, the set of reference points are a start point and end point of the first path.

In some embodiments, the communicating the one or more first portions to the second electronic device occurs in response to the authenticating the second electronic device.

In some embodiments, the second set of portions do not overlap with the first set of portions.

Some embodiments further include communicating a total number of points in the first path information to the second electronic device.

Some embodiments further include receiving a total number of points in the second path information from the second electronic device; comparing the total number of points in the second path information to a total number of points in the first path information; and based on a difference between the total number of points in the second path information and the total number of points in the first path information, using a curve fitting algorithm to generate missing data points.

In some embodiments, touch interface is a touchscreen.

Embodiments of the present disclosure include a system including one or more processors; and a computer readable storage medium communicatively coupled to the one or more processors, the computer readable storage medium containing program instructions executable by the one or more processors to cause the one or more processors to perform the methods described herein.

Embodiments of the present disclosure include a computer program product comprising a computer readable storage medium having program code embodied therewith, the program code executable by a processor to cause the processor to perform the methods described herein.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to example embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   storing, by a first electronic device, first path information in a memory, the first path information comprising data representing a first path of input on a touch interface associated with the first electronic device;
   communicating one or more first portions of the first path information to a second electronic device, wherein less than all of the first path information is communicated to the second electronic device;
   receiving, in response to communicating the one or more first portions, one or more second portions of second path information from the second electronic device, wherein the second path information comprises data representing a second path of input on a touch interface associated with the second electronic device, and wherein the one or more second portions at least partially do not overlap with the one or more first portions;
   comparing the one or more second portions to the first path information; and
   authenticating, by the first electronic device, the second electronic device based on similarity between the one or more second portions and the first path information.

2. The method of claim 1, further comprising establishing, in response to the authenticating, a connection between the first electronic device and the second electronic device.

3. The method of claim 1, wherein the first path information comprises coordinates for points on the first path.

4. The method of claim 1, wherein the first path information comprises a time for each point on the first path.

5. The method of claim 1, wherein points in the first path are referenced by angles and relative distances calculated based on a set of reference points.

6. The method of claim 5, wherein the set of reference points are a start point and end point of the first path.

7. The method of claim 1, wherein the communicating the one or more first portions to the second electronic device occurs in response to the authenticating the second electronic device.

8. The method of claim 1, wherein the one or more second portions do not overlap with the one or more first portions.

9. The method of claim 3, further comprising communicating a total number of points in the first path information to the second electronic device.

10. The method of claim 1, further comprising:
    receiving a total number of points in the second path information from the second electronic device;
    comparing the total number of points in the second path information to a total number of points in the first path information; and
    based on a difference between the total number of points in the second path information and the total number of points in the first path information, using a curve fitting algorithm to generate missing data points.

11. The method of claim 1, wherein the touch interface is a touchscreen.

12. A system comprising:
    one or more processors; and
    a computer readable storage medium communicatively coupled to the one or more processors, the computer readable storage medium containing program instructions executable by the one or more processors to cause the one or more processors to perform a method comprising:
- storing, by a first electronic device, first path information in a memory, the first path information comprising data representing a first path of input on a touch interface associated with the first electronic device;
- communicating one or more first portions of the first path information to a second electronic device, wherein less than all of the first path information is communicated to the second electronic device;
- receiving, in response to communicating the one or more first portions, one or more second portions of second path information from the second electronic device, wherein the second path information comprises data representing a second path of input on a touch interface associated with the second electronic device, and wherein the one or more second portions at least partially do not overlap with the one or more first portions;
- comparing the one or more second portions to the first path information; and
- authenticating, by the first electronic device, the second electronic device based on similarity between the one or more second portions and the first path information.

13. The system of claim 12, wherein the method further comprises establishing, in response to the authenticating, a connection between the first electronic device and the second electronic device.

14. The system of claim 12, wherein the first path information comprises coordinates for points on the first path.

15. The system of claim 12, wherein the first path information further comprises a time for each point on the first path.

16. The system of claim 12, wherein points in the first path are referenced by angles and relative distances calculated based on a set of reference points.

17. A computer program product comprising a computer readable storage medium having program code embodied therewith, the program code executable by a processor to cause the processor to perform a method comprising:
- storing, by a first electronic device, first path information in a memory, the first path information comprising data representing a first path of input on a touch interface associated with the first electronic device;
- communicating one or more first portions of the first path information to a second electronic device, wherein less than all of the first path information is communicated to the second electronic device;
- receiving, in response to communicating the one or more first portions, one or more second portions of second path information from the second electronic device, wherein the second path information comprises data representing a second path of input on a touch interface associated with the second electronic device, and wherein the one or more second portions at least partially do not overlap with the one or more first portions;
- comparing the one or more second portions to the first path information; and
- authenticating, by the first electronic device, the second electronic device based on similarity between the one or more second portions and the first path information.

18. The computer program product of claim 17, wherein the method further comprises establishing, in response to the authenticating, a connection between the first electronic device and the second electronic device.

19. The computer program product of claim 17, wherein the first path information comprises coordinates for points on the first path.

20. The computer program product of claim 17, wherein the first path information further comprises a time for each point on the first path.

* * * * *